3,793,377
SULFURIC ACID CATALYZED CHLORINATION
OF DIPHENYL OXIDE
Henry E. Hennis, Coleman, Mich., assignor to The Dow
Chemical Company, Midland, Mich.
No Drawing. Filed Jan. 3, 1972, Ser. No. 215,212
Int. Cl. C07c 43/28
U.S. Cl. 260—612 R                       5 Claims

ABSTRACT OF THE DISCLOSURE

The use of catalytic quantities of sulfuric acid enhances para-chlorination of diphenyl oxide with low tar formation. Para-chlorinated diphenyl oxides are desirable linear precursors for polymers and detergents.

BACKGROUND OF THE INVENTION

In the past, diphenyl oxide has been chlorinated in the absence of a catalyst, but using acetic acid solvent, and with certain Lewis acid catalysts. Such reactions have been reported, inter alia, by H. Weingarten and R. M. Schisla, J. Org. Chem., 27, 4103 (1962). High para to ortho ratios have been obtained when diphenyl oxide is chlorinated either under noncatalytic conditions or noncatalytic conditions utilizing an acetic acid solvent. However, in the former case, high distillation residue tars result. In fact, tars often constitute 45% of the reaction product under these conditions, making the process impracticable. In the case of the use of an acetic acid solvent, the selective reaction of para to ortho is negated by the necessity to dispose of huge amounts of acetic acid or the recovery and recycle of the acetic acid.

Lewis acid catalysts do not obtain high para to ortho ratios and the weaker ones permit an unknown side reaction to seriously compete with the substitution reaction thereby again resulting in high distillation residue tars.

These difficulties have initiated a search for an effective catalyst which will give a high para to ortho ratio and an attendant absence of the aforementioned problems.

SUMMARY OF THE INVENTION

According to the present invention, parachlorination of diphenyl oxide is enhanced with insignificant tar formation resulting through the use of catalytic quantities of concentrated sulfuric acid.

The process of the present invention is applicable to both the monochlorination and dichlorination of diphenyl oxide. To produce monochlorinatesd diphenyl oxide, an equimolar amount of chlorine is added and reacted with the diphenyl oxide and catalyst while two equivalents of chlorine are added to produce the dichlorinated diphenyl oxide.

The essential and novel feature of the present invention is the utilization of a small but effective amount of concentrated sulfuric acid during the diphenyl oxide-chlorine reaction. The concentration ranges of the aqueous sulfuric acid for use in the present invention are from about 95% to about 100% sulfuric acid. A preferable range of concentration is from about 97% to about 100%. The lower concentrations of sulfuric acids pose a problem of miscibility with the diphenyl oxide and thus give poorer results in a chlorination reaction. Catalyst activity is also reduced because the sulfuric acid becomes tied up as a hydrate. Concentrations higher than 100% lead to sulfonation reactions which result in decreased desired yields.

The mole equivalence of concentrated sulfuric acid used as a catalyst per mole of diphenyl oxide should be in the range of .0025 to .25, with the preferred range being .0050 to .05. When higher mole ratios are used, the ratio of para to ortho on both monochlorination and dichlorination is reduced somewhat. These higher mole ratios are useful when it is desired to carry out the reaction at lower temperatures.

A wide range of temperatures may be used. Thus, the reaction of the present invention may be beneficially produced utilizing temperature from about 0° to about 250° C. with the preferred range of temperature being from about 50° to about 150° C. When the reaction is desired to be run at temperatures from about 0° to about 28° C., an inert solvent such as carbon tetrachloride and the like may be utilized to lower the melting point of the diphenyl oxide. Alternatively, some of the chlorinated diphenyl oxide may be recycled to insure a lower melting point at these temperatures. The pressure under which the reaction takes place is of no importance. The reaction may be run in an open vessel. Similarly, a time of reaction is not a factor, because the chlorination rate is so fast that effective cooling is the rate determinating factor.

The ratio of the reactants is important. As previously indicated above, the diphenyl oxide-chlorine molar ratio must be matched to obtain the degree of chlorination desired.

SPECIFIC EMBODIMENTS

Example 1.—Monochlorination of diphenyl oxide

Into a round bottom flask equipped with a chlorine sparger inlet tube, stirrer, thermometer, and an air-cooled condenser connected in turn to a Dry Ice-acetone condenser was placed 255 g. (1.50 moles) of diphenyl oxide and 0.7 g. (0.0050 mole) of 98% sulfuric acid. The mixture was heated to 50° C. and chlorine was conducted into the reaction mixture with stirring. After 1.5 moles (an equimolar amount) of chlorine was added and reacted, the reaction mixture was analyzed via gas liquid chromatography as shown in Table I.

TABLE I

| Component: | Area percent |
|---|---|
| Diphenyl oxide | 15 |
| o-Chlorodiphenyl oxide | 8 |
| p-Chlorodiphenyl oxide | 67 |
| Dichlorodiphenyl oxide | 10 |

Thus, it is seen that in the monochlorination of diphenyl oxide using the catalyst of the present invention a para to ortho ratio of 8.4 is obtained.

Example 2.—Dichloronation of diphenyl oxide

The reaction of Example 1 was continued by adding another 1.5 moles of chlorine with stirring at the same temperature. The reaction mixture was again analyzed via gas liquid chromatography as shown in Table II.

TABLE II

| Component: | Area percent |
|---|---|
| o-Chlorodiphenyl oxide | 6 |
| p-Chlorodiphenyl oxide | 27 |
| o,p-Dichlorodiphenyl oxide | 3 |
| o,p'-Dichlorodiphenyl oxide | 12 |
| p,p'-Dichlorodiphenyl oxide | 43 |
| Trichlorodiphenyl oxide | 9 |

Thus, in the dichlorination of diphenyl oxide utilizing the catalyst of the present invention of p,p' to o,p' ratio of 3.6 was obtained.

Example 3.—Effect of higher mole ratio of catalyst at 50° C.

Utilizing the same conditions and equipment as in Examples 1 and 2, above, diphenyl oxide and chlorine were reacted to first produce monochlorination and later dichlorination except that 36.8 grams of catalyst was used (0.25 mole) rather than the 0.7 gram previously utilized. The para to ortho ratio was lower using the higher mole equivalents of concentrated sulfuric acid. However, a comparison of these results with the results shown below in Table III wherein Lewis acid catalysts were used show that the sulfuric acid catalyst was still more effective than the Lewis acid catalysts even at such higher mole equivalents. Thus, using 36.8 g. of 98% sulfuric acid (0.25 mole per 1.0 mole) of diphenyl oxide) a para to ortho ratio of 5.7 on monochlorination was obtained while a p,p' to o,p' ratio of 2.5 on dichlorination was obtained. On monochlorination the reaction mixture was analyzed via gas liquid chromatography to show 75% mono-products while the analysis of the dichlorination showed 87% of the reaction mixture to be di-products with 2% trichlorodiphenyl oxide.

Example 4.—Chlorination of diphenyl oxide using Lewis acid catalysts

A comparison of the effectiveness of Lewis acid catalysts with the sulfuric acid catalyst of the present invention was conducted under the same conditions as in Example 1 above. In all cases 1.50 moles of diphenyl oxide was reacted first with an equimolar amount of chlorine and the para to ortho ratio was analyzed. The experiment was then continued adding a second 1.5 moles of chlorine and the reaction mixture was again analyzed via gas liquid chromatography to determine the p,p' to o,p' ratio. In all cases 0.0050 mole of catalyst per 1 mole of diphenyl oxide was used. The table below shows the comparison of the Lewis acid catalyst and sulfuric acid.

TABLE III

| Catalyst | Monochlorination, p/o | Dichlorination, p,p'/o,p |
|---|---|---|
| AlCl₃ | 5.2 | 2.2 |
| AlBr₃ | 5.2 | 2.0 |
| FeCl₃ | 4.9 | 1.7 |
| SnCl₄ | 2.8 | 1.1 |
| H₂SO₄ | 8.4 | 3.6 |

Thus, on an equivalent basis and on a lower weight basis, concentrated sulfuric acid is shown to be a more effective para-chlorination catalyst than the Lewis acid screen.

The para-substituted chlorinated diphenyl oxides produced by the present invention are useful in the preparation of many compounds. These chlorinated diphenyl oxide compounds may be hydrolyzed to form the corresponding hydroxydiphenyl compound where the hydroxyl group replaces the halogen. Thus, the para-chlorodiphenyl oxide is an intermediate for sulfonated detergents and the p,p'-dichlorodiphenyl oxide can be hydrolyzed to yield a 4,4'-dihydroxydiphenyl oxide which in turn can be polymerized by esterification with a dibasic acid to yield a linear polymer.

I claim:
1. A process for the production of mono- and dichlorinated diphenyl oxide which comprises reacting diphenyl oxide with chlorine at a reaction temperature of from about 0° to about 250° C. in the presence of from about .0025 to about .25 mole of concentrated sulfuric acid per 1 mole of diphenyl oxide wherein the molar ratio of the chlorine is 1 or 2 moles per 1 mole of diphenyl oxide.

2. A process according to claim 1 wherein the concentration of said sulfuric acid is in the range of 95% to 100%.

3. A process according to claim 1 wherein the molar ratio of said sulfuric acid is in the range of .0050 to .05 mole per 1 mole of said diphenyl oxide.

4. A process according to claim 1 wherein the concentration of said sulfuric acid is in the range of 97% to 100%.

5. A process for the production of mono- and dichlorodiphenyl oxide which comprises reacting diphenyl oxide with chlorine in the presence of sulfuric acid at a temperature in the range of from about 50° to about 150° C., wherein the concentration of said sulfuric acid is in the range of 97% to 100%, and the molar ratio of said sulfuric acid is in the range of .0050 to .05 per 1 mole of diphenyl oxide.

References Cited

UNITED STATES PATENTS 3,232,959   2/1966   Hahn _____ 260—612 R X

FOREIGN PATENTS 681,306   3/1964   Canada _____ 260—612 R

BERNARD HELFIN, Primary Examiner